(12) United States Patent
Larsson

(10) Patent No.: US 9,906,640 B2
(45) Date of Patent: Feb. 27, 2018

(54) ACCESSING IN CASE OF EMERGENCY INFORMATION IN A MOBILE DEVICE

(71) Applicant: SONY MOBILE COMMUNICATIONS AB, Lund (SE)

(72) Inventor: Bo Hakan Larsson, Malmo (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/439,601

(22) PCT Filed: Nov. 1, 2013

(86) PCT No.: PCT/IB2013/059840
§ 371 (c)(1),
(2) Date: Apr. 29, 2015

(87) PCT Pub. No.: WO2014/068523
PCT Pub. Date: May 8, 2014

(65) Prior Publication Data
US 2015/0271315 A1    Sep. 24, 2015

(30) Foreign Application Priority Data
Nov. 1, 2012    (EP) .................................... 12190971

(51) Int. Cl.
*H04M 1/725*    (2006.01)
*H04M 1/673*    (2006.01)
(Continued)

(52) U.S. Cl.
CPC ....... *H04M 1/72541* (2013.01); *H04M 1/673* (2013.01); *H04M 1/72583* (2013.01);
(Continued)

(58) Field of Classification Search
CPC ..... H04W 76/007; H04W 4/00; H04W 88/02; H04W 4/22; H04M 1/72541; H04M 1/72536; H04M 11/04
(Continued)

(56) References Cited

U.S. PATENT DOCUMENTS 7,466,235 B1    12/2008   Kolb et al.
8,649,759 B2 *  2/2014   Scott ................... H04M 1/2745
                                                      455/404.1
(Continued)

FOREIGN PATENT DOCUMENTS

WO         2009063007 A1    5/2009

OTHER PUBLICATIONS

International Search Report dated Feb. 17, 2014, issued in PCT application PCT/IB2013/059840.
(Continued)

*Primary Examiner* — Olumide T Ajibade Akonai
(74) *Attorney, Agent, or Firm* — Tucker Ellis, LLP

(57) ABSTRACT

A method of accessing In Case of Emergency ICE information in a mobile entity (100); the method comprises the steps of: actuating a state transition of a key (105) of the mobile entity (100); presenting a menu for selecting at least one operational mode of said mobile entity (100) as a response to said actuating of the key (105); wherein said menu further comprises an option of retrieving ICE information accessible from a memory of said mobile entity (100); receiving said ICE information from said memory by selecting said option of retrieving ICE information in said menu among said options representing operational modes of said mobile entity (100); and rendering said ICE information, whereby said ICE information is accessed (303).

19 Claims, 4 Drawing Sheets

(51) Int. Cl.
 *H04W 76/00* (2018.01)
 *H04M 11/04* (2006.01)
 *H04W 4/22* (2009.01)

(52) U.S. Cl.
 CPC .............. *H04M 11/04* (2013.01); *H04W 4/22* (2013.01); *H04W 76/007* (2013.01)

(58) Field of Classification Search
 USPC .................................. 455/404.1, 550.1, 566
 See application file for complete search history.

(56) References Cited

U.S. PATENT DOCUMENTS

| | | | | |
|---|---|---|---|---|
| 2007/0102527 | A1* | 5/2007 | Eubank | G08B 25/006 235/492 |
| 2007/0135043 | A1* | 6/2007 | Hayes | H04M 1/67 455/26.1 |
| 2007/0243853 | A1* | 10/2007 | Bumiller | G06F 19/323 455/404.1 |
| 2008/0168290 | A1* | 7/2008 | Jobs | G06F 1/26 713/324 |
| 2009/0061953 | A1* | 3/2009 | Jang | H04W 52/0251 455/572 |
| 2009/0089803 | A1* | 4/2009 | Biggs | G06F 21/554 719/318 |
| 2009/0164467 | A1 | 6/2009 | Ala-Lahti | |
| 2009/0197566 | A1* | 8/2009 | Ito | G08B 21/10 455/404.1 |
| 2009/0205041 | A1* | 8/2009 | Michalske | G06F 21/31 726/17 |
| 2013/0060853 | A1* | 3/2013 | Kim | H04W 4/08 709/204 |

OTHER PUBLICATIONS

European Office Action from corresponding European Application No. 13792493.2, dated Jun. 29, 2017.
"Sony Ericsson P910i Bedienungsanleitung", User's Guide Sony Eric., Jun. 30, 2004, pp. 1-237, XP009131286.

* cited by examiner

ACCESSING IN CASE OF EMERGENCY INFORMATION IN A MOBILE DEVICE

RELATED APPLICATIONS

This patent application claims the benefit under 35 U.S.C. § 371 of International Application Number PCT/IB2013/059840, filed Nov. 1, 2013, which claims priority to European Patent Application No. 12190971.7 EP, filed Nov. 1, 2012, both of which are incorporated herein by reference.

TECHNICAL FIELD

The present invention relates to the field of mobile entities and more specifically to the access of In Case of Emergency information in a mobile entity.

BACKGROUND ART

A variety of mobile entities (such as smart phones mobile telephones, smart phones, lap tops, tablets/media plates (e.g. iPad®), communicators), are widely used today. The user of a mobile entity has the possibility to store In Case of Emergency (ICE) information in the mobile entity. The ICE information is personal information of the user regarding who to contact and how to contact a person if the user has an emergency of some kind and not themselves is in a state to inform a third person of the ICE information. The ICE information is directed to a third party, such as ambulance personnel, which is not familiar with the mobile entity.

The ICE information is often stored as a contact in the contact book that is stored in a database of the mobile entity. The ICE information is accessible via selecting the menus of the contact book, however, this demands that the mobile entity is turned on and that the user is authenticated to unlock the mobile entity.

To facilitate that a third party can access the ICE information even though they are not familiar with a specific model of a mobile entity, a standard has been drawn up, the 3GPP standard, which in one part defines how ICE information should be accessible. In this standard it is stated that the ICE information should be disclosed in the display of the mobile entity if the "*" key is pressed down 3 times "***". Further it is defined that the ICE information also should be accessible in this way and disclosed in the display if the mobile entity is in a sleeping mode or in a locked mode.

However, many of today's mobile entities do not have a physical key pad and there is a need of an easy and quick way to access ICE information in a mobile entity.

SUMMARY OF THE INVENTION

With the above description in mind, then, an aspect of the present invention is to provide a method of accessing In Case of Emergency (ICE) information in a mobile entity; the method comprises the steps of: actuating a state transition of a key of the mobile entity; presenting a menu for selecting at least one operational mode of said mobile entity as a response to said actuating of said key; wherein said menu further comprises an option of retrieving ICE information accessible from a memory of said mobile entity; receiving said ICE information from said memory by selecting said option of retrieving ICE information in said menu among said options representing operational modes of said mobile entity; and rendering said ICE information, whereby said ICE information is accessed.

By using said method the ICE information could be accessed in an easy and quick way by a user without having prior knowledge of a specific mobile entity model. It also makes it possible to access ICE information in many different mobile entity models without limiting the design of the mobile entity.

According to one aspect, the steps are performed in an operational mode of the mobile entity in which user input is requested to unlock the mobile entity. According to one aspect, the steps are performed in an operational mode of the mobile entity requesting SIM PIN input from the user to unlock the mobile entity, user input to unlock the mobile entity from unauthorized use or user input to unlock the mobile entity from accidental use. This makes the ICE information accessible even if the mobile entity is in an operational mode requesting some kind of input that only the owner of the mobile entity has knowledge about. As the access to ICE information is accessible even if the mobile entity is locked, a third person can access the ICE information and use it without input from the owner of the mobile entity.

According to one aspect one operational mode of said menu is a power option mode for turning off the mobile entity. According to one aspect the key is a button. According to one aspect the button is a power button. The power button is a common feature of the majority of different mobile entity models and a key that is easy and quick to find and that does not need any prior knowledge of the mobile entity to identify. The power button does not need any (or very low) amount of power to be on hold to be used.

According to one aspect, the rendering of ICE information is rendered by audio or visually. According to one aspect the rendering of ICE information is performed by displaying the ICE information on a display of the mobile entity. According to one aspect, rendering of ICE information is performed by voice rendering from a speaker of the mobile entity.

According to one aspect, the ICE information comprise a contact menu for selecting at least one contact mode for communicating with at least one contact comprised in the ICE information. According to one aspect, the contact mode could be SMS, MMS, e-mail, a voice call, a video call or a phone call.

According to one aspect, the menu is only presented if the key is actuated until the menu is presented.

According to one aspect, the step of receiving said ICE information from said memory further comprise the steps of a processing unit of the mobile entity of retrieving said ICE information from a SIM card or a server and storing said ICE information on said memory.

Another aspect of the present invention is to provide a mobile entity comprising at least one key, a memory and In Case of Emergency (ICE) information stored in said memory; wherein the mobile entity is: adapted to present a menu for selecting at least one operational mode of said mobile entity as a response of actuating of the key; wherein said menu further comprises an option of retrieving the ICE information from the memory of said mobile entity; and adapted to render said ICE information as a response to the selection of said option of retrieving the ICE information.

According to one aspect, the mobile entity further comprises a display and wherein the display is adapted to render the ICE information by displaying it on said display.

According to one aspect, the mobile entity further comprises a speaker and wherein the speaker is adapted to render the ICE information by voice rendering it on said speaker.

According to one aspect, the key of the mobile entity is a power button. According to one aspect, one of said operational mode is a power off mode.

BRIEF DESCRIPTION OF THE DRAWINGS

Further objects, features, and advantages of the present invention will appear from the following detailed description of some embodiments and variants of the invention, wherein some embodiments or variants of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In Case of Emergency, ICE, information is personal information that the user of a mobile entity enter into their mobile entity. The ICE information can comprise information from the user regarding who to contact and how to contact that person, if the user has an emergency of some kind. The ICE information could also comprise information regarding special medical conditions or allergies of the user of the mobile entity. The ICE information is directed to be accessed by a third party, such as ambulance personnel, which is not familiar with the mobile entity and does not know the user of the mobile entity. The ICE information as such, is well known in the prior art and will thus not be further described herein.

Figure 1:
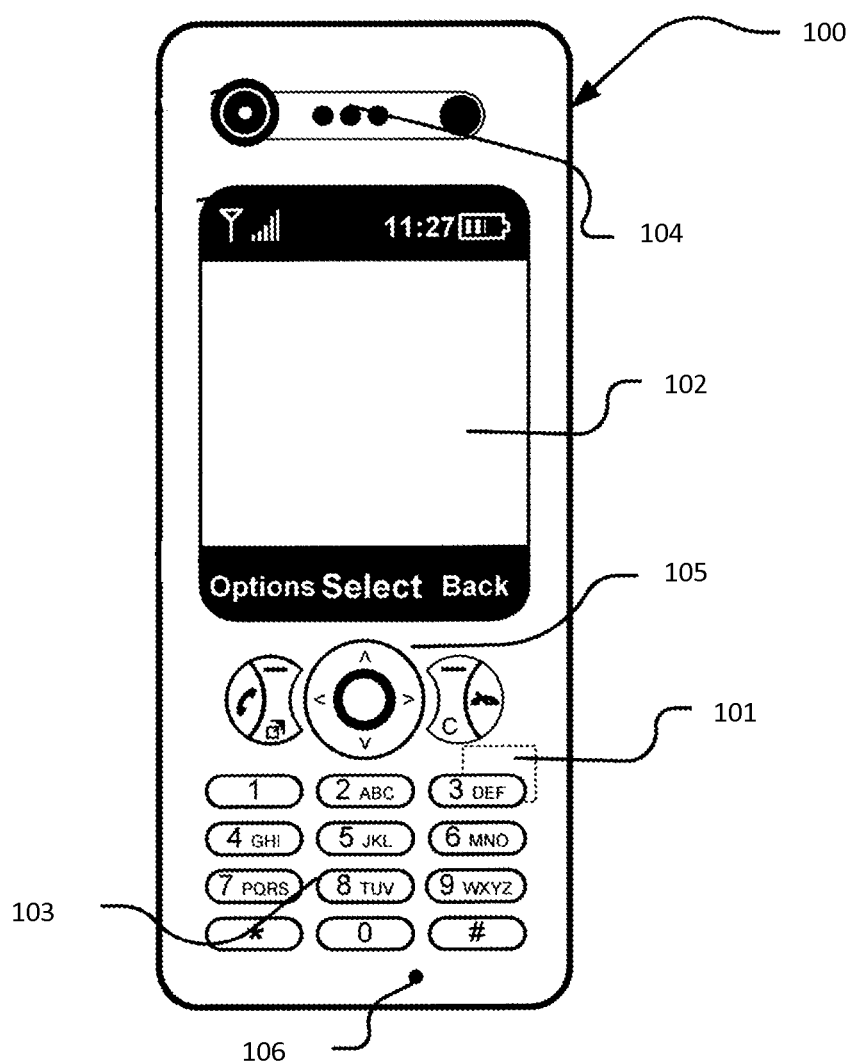
FIG. 1 shows a mobile entity with a physical key pad.

FIG. 1 shows a mobile entity 100 seen from the front comprising a casing 101, a memory, a processing unit, a display 102, and key pad 103. The mobile entity also comprise a key 105 for turning off and on the mobile entity 100. The key 105 is a power button 105. The power button 105 can also be used for other purposes than to turn the power on or off of the mobile entity 100. The mobile entity 100 also comprises a speaker 104 and a microphone 106.

An output unit generally includes various components that support the output requirement of the mobile entity 100. A display unit 102 is typically implemented to visually display information associated with the mobile entity 100. On the display unit 102, information, such as text, images, videos, and the like, as well as control elements, functions menus, or other graphical elements for operating the mobile entity 100 may be displayed.

Figure 2:
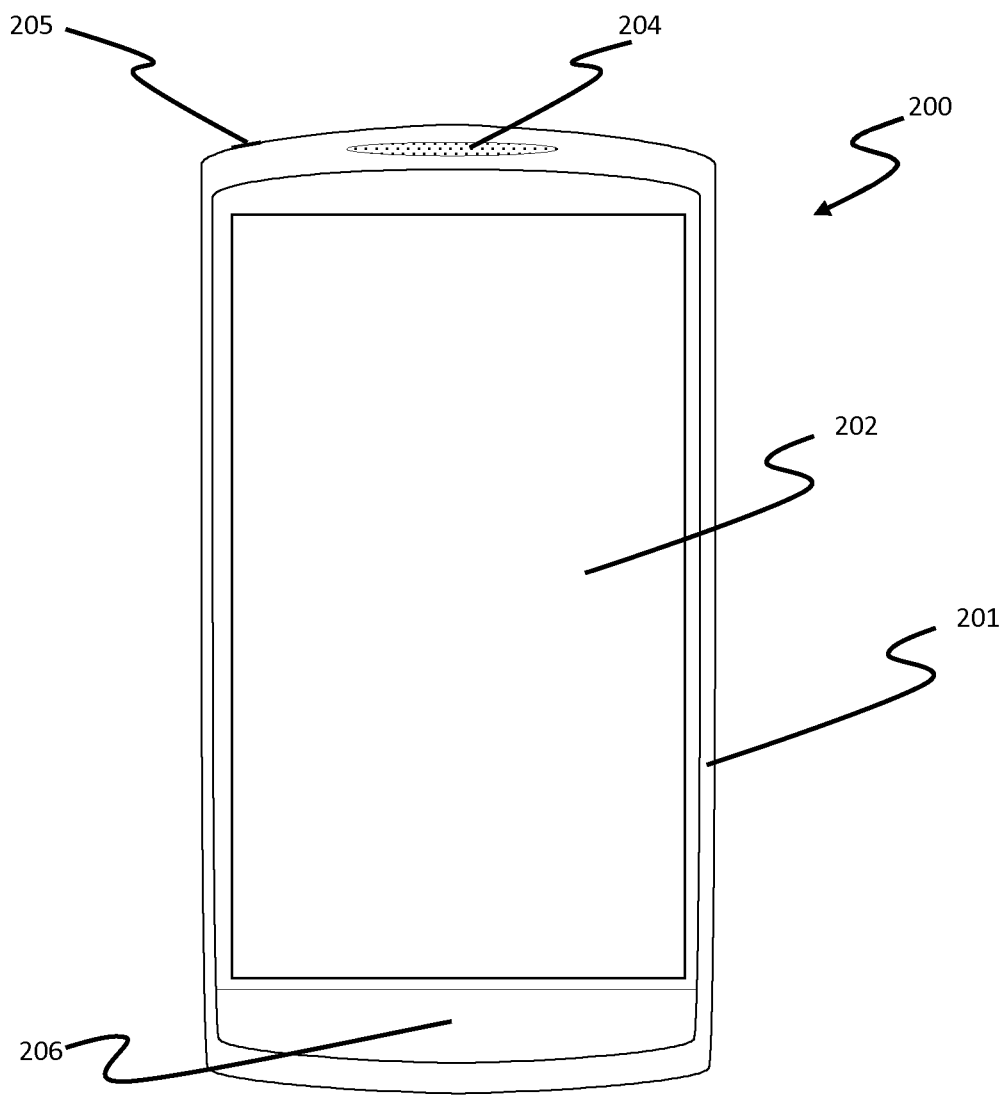
FIG. 2 shows a mobile entity with a touch screen.

In FIG. 2 a mobile entity 200 comprising a casing 201, a memory, a processing unit, a display unit 202, in the form of a touch panel 202, a speaker 204, a key 205, for turning off and on the mobile entity 200, and a microphone 206. The key 205 is a power button 205. This configuration permits the display unit 202 to function both as an output unit and an input means.

The mobile entities 100, 200 as such, are known from the prior art and will thus not be more described in detail hereafter.

Figure 3:
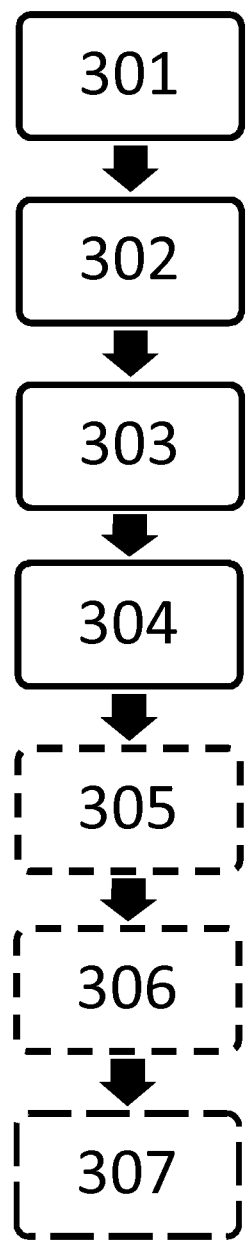
FIG. 3 shows a flow chart of a method for accessing ICE information in a mobile entity.
Figure 4:
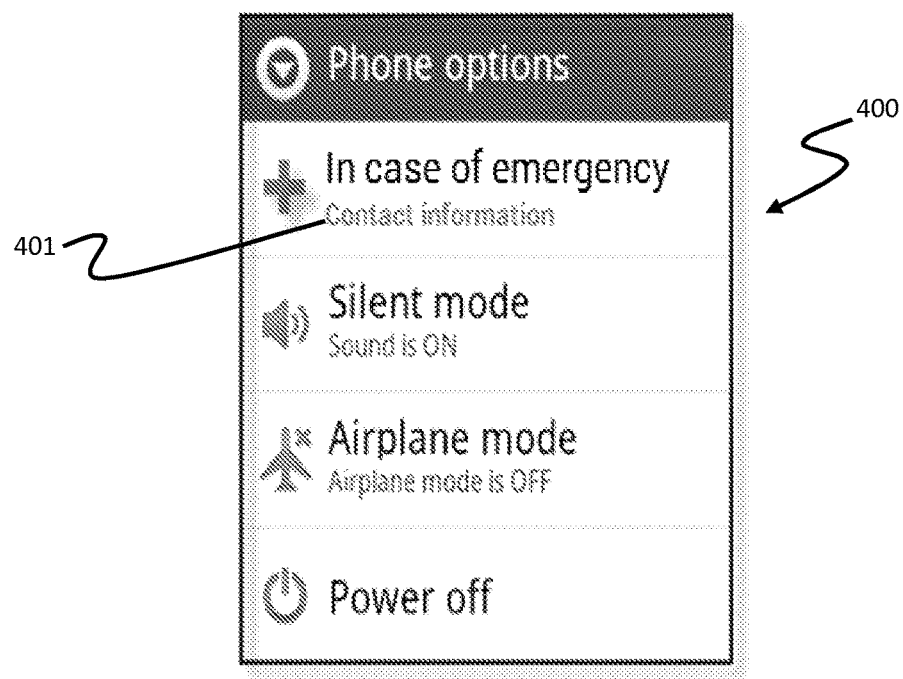
FIGS. 4 and 5 shows a menu of operational modes including ICE information.
Figure 5:
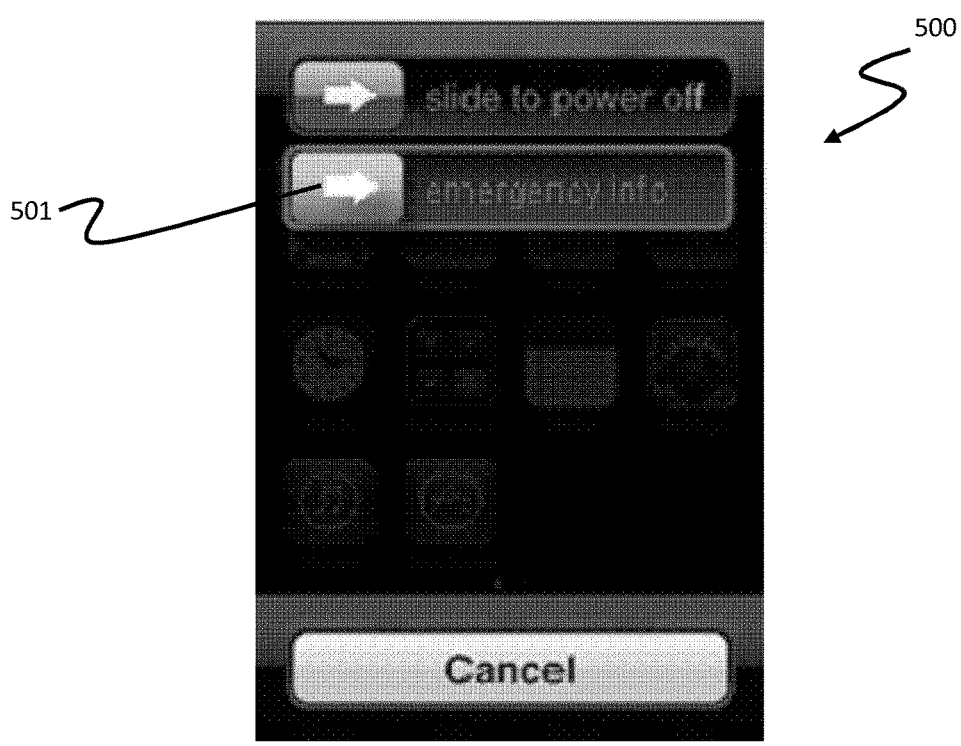

A method of accessing ICE information in a mobile entity 100, 200 will hereafter be described in connection to FIG. 3-5. The ICE information is stored in a memory of the mobile entity 100, 200. According to one aspect, the ICE information is stored on a remote server accessible by said memory of the mobile entity or in any other circuit within or outside the mobile entity accessible by the memory of the mobile entity. If a user or a third party would like to access ICE information from a mobile entity 100, 200, a dedicated key 105, 205 is actuated by actuating a state transition of the key 105, 205, step 301 in FIG. 3. The dedicated key is in FIGS. 1 and 2 the power button 105, 205 of the mobile entity 100, 200. The actuating a state transition of the key 105, 205 in a mobile entity 100, 200 as disclosed in FIGS. 1 and 2 is pressing on the power button 105, 205.

As a response to that the power button 105, 205 is actuated, a menu 400, 500 for selecting at least one operational mode of said mobile entity 100, 200 is presented, step 302. The operational modes in the menu could be flight mode, silent mode, sleeping mode, locked mode or SIM pin locked mode. An operational mode in the menu could also be a power option mode, in which the option of turning on or off the mobile entity could be selected. The menu 400, 500 further comprises the option of retrieving ICE information. In FIGS. 4 and 5 the menu 400, 500 is a visual menu disclosing different options for the user to select among. One of the options in the menu 400, 500 in FIGS. 4 and 5 is the option of selecting ICE information 401, 501. According to one aspect, the menu could be rendered as an audio menu. The different options in the menu could be rendered as voice audio from the speaker of the mobile entity.

Thereafter, the third party, or anybody using the mobile entity 100, 200, selects the option of receiving ICE information from the menu, step 303.

Thereafter the ICE information is retrieved from the memory, by reading the memory, step 304. If the ICE information is remotely stored, the step of rendering said ICE information further comprises the step of fetching the ICE information from the remote location to a memory of the mobile entity and then retrieving the ICE information by reading the memory.

In the next step the mobile entity renders the ICE information on the mobile entity, step 305.

By rendering the ICE information, the ICE information is accessed by the person handling the mobile entity, step 306. The ICE information could be rendered by audio or visually. The ICE information could be displayed on the display 102, 202 of the mobile entity or by voice rendering from the speaker 104, 204 of the mobile entity 100, 200.

According to one aspect, the method also comprise the step of that after the ICE information has been accessed by the person handling the mobile entity they, the person could use the mobile entity to contact a contact mentioned in the ICE information, step 307. The person could make a phone call, send a SMS, a MMS, a video call or an e-mail to the contact identified in the ICE information. According to one aspect, the person who accessed the ICE information could use the ICE information on another mobile entity.

The ICE information should be accessible to a person even if the mobile entity is in a locked mode. The power button 105, 205 is accessible and operational and responds to user actuation even if the mobile entity is locked and an action of the user is requested to unlock the mobile entity 100, 200. As the key, and especially the power button, is accessible and operational without unlocking the mobile entity, the method to access the ICE information could be performed without unlocking the mobile entity. In this way the ICE information is easily accessed without the need of unlocking the mobile entity or the need of prior knowledge of how a specific mobile entity model is operated. This is also a secure way of accessing ICE information without the risk of miss use of the mobile entity.

According to one aspect, the power button is accessible and responds to user actuation in an operational mode of the mobile entity requesting SIM PIN input from the user. According to one aspect the power button is accessible and responds to user actuation in an operational mode of the mobile entity requesting user input to unlock the mobile entity from unauthorized use. According to one aspect, the power button is accessible and responds to user actuation in an operational mode of the mobile entity requesting user input to unlock the mobile entity from accidental use. According to one aspect, the power button is accessible and responds to user actuation when the power of the mobile entity is turned off. According to one aspect, the power button is accessible and responds to user actuation when the mobile entity is unlocked.

According to one aspect, the key is a power button. One advantage of using the power button as the key to access the ICE information, is that it is easy to find and that it is easy to access by a person that is not familiar with a specific model of a mobile entity. A mechanical power button also has the advantage of not using any energy when not used.

The mobile entity has many different operational modes that could be disclosed in the menu. A few examples of different operational modes are flight mode, silent mode, sleeping mode, locked mode, SIM pin locked mode and power on mode. Another mode of the mobile entity is a power off mode.

The selecting of the ICE information option from the menu could be made in many different ways. According to one aspect, user may select one option in the menu by clicking on the option if the device is equipped with a touch screen. According to one aspect user, may select one option in the menu by performing a swiping gesture with one or more fingers on the display if the device is equipped with a touch screen. According to one aspect, user may select one option in the menu by pressing hardware keys. According to one aspect, user may select one option in the menu by using his voice to select the option if the device supports voice control. According to one aspect, user may select one option in the menu by using a gesture to select the option if the device supports gesture control, either by moving the device itself (e.g. if an accelerometer is used) or e.g. his hand (e.g. if a camera is used). According to one aspect, user may select one option in the menu by using his eyes to select the option if the device supports eye tracking.

The method of accessing ICE information could also comprise the step of informing the user of the mobile entity that the ICE information has been accessed. This could be done by sending an e-mail, SMS or MMS to the user of the mobile entity or by disclosing a message to the user when the mobile entity is used after that ICE information has been accessed. By doing this the user will be aware of if the ICE information or the mobile entity has been miss used in some way.

According to one aspect, the menu can comprise a second option of how to use the ICE information. The second option could be to send the ICE information to a contact without rendering the ICE information as such to the user. If the second option is selected, the mobile entity sends the ICE information to a contact as a response to said selection. This second option could also be presented in a separate menu. The contact could be a contact identified by the third party or a contact that is predefined of the user of the mobile entity. By this step, the third person handling the mobile entity could send the ICE information to another person that has the possibility to use the ICE information. An example is that the user of the mobile entity has had an accident and an ambulance personnel is accessing the ICE information. The ambulance personnel could then select to send the ICE information to the hospital to a contact that has the time and possibility to use the ICE information, as the ambulance personnel's focus is to take care of the user and the patients.

According to one aspect, the actuating of the key has to actuated until the menu for selecting at least one operational mode is presented. If the actuation is ended before the menu is presented the menu will not be presented. This reduces the risk of that ICE information is accessed by mistake.

The mobile entity could be a smart phone, a mobile telephone, a lap top, a tablets/media plates or a communicator.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described.

The invention claimed is:

1. A method of accessing In Case of Emergency (ICE) information in a mobile entity; the method comprises the steps of:
    actuating a state transition of a key of the mobile entity;
    presenting a menu for selecting at least one operational mode of said mobile entity as a response to said actuation of said key, wherein said menu comprises an option of retrieving ICE information accessible from a memory of said mobile entity;
    receiving said ICE information from said memory by selecting said option of retrieving ICE information in said menu;
    sending the ICE information to a contact without rendering the ICE information on the mobile entity, as a result of the selecting said option of retrieving ICE information in said menu; and informing a user of the mobile entity that the ICE information was accessed by disclosing a message to the user during use of the mobile entity after the accessing of the ICE information.

2. A method according to claim 1, wherein the presenting and receiving are performed in an operational mode of the mobile entity in which user input is requested to unlock the mobile entity.

3. A method according to claim 1, wherein the presenting and receiving are performed in an operational mode of the mobile entity requesting SIM PIN input from the user to unlock the mobile entity, user input to unlock the mobile entity from unauthorized use or user input to unlock the mobile entity from accidental use.

4. The method according to claim 1, wherein one operational mode of said menu is a power option mode for turning off the mobile entity.

5. The method according to claim 1, wherein said key is a button.

6. The method according to claim 5, wherein said button is a power button.

7. The method according to claim 1, wherein a contact menu for selecting the contact is rendered on the mobile entity.

8. The method according to claim 1, wherein the ICE information is sent to the contact in the form of SMS, MMS, e-mail, video call or phone call.

9. The method according to claim 1, wherein the menu only is presented if the key is actuated until the menu is presented.

10. The method according to claim 1, wherein the step of receiving said ICE information from said memory further comprise the steps of a processing unit of the mobile entity retrieving said ICE information from a SIM card or a server, and storing said ICE information on said memory.

11. A method according to claim 1,
wherein the presenting and receiving are performed in an operational mode of the mobile entity in which user input is requested to unlock the mobile entity; and
wherein one operational mode of said menu is a power option mode for turning off the mobile entity.

12. The method according to claim 11,
wherein a contact menu for selecting the contact is rendered on the mobile entity;
wherein the ICE information if sent to the contact in the form of an SMS, MMS, e-mail, video call or phone call;
wherein the menu only is presented if the key is actuated until the menu is presented; and
wherein the step of receiving said ICE information from said memory further comprise the steps of a processing unit of the mobile entity of retrieving said ICE information from a SIM card or a server and storing said ICE information on said memory.

13. The method according to claim 1, wherein the contact is predefined.

14. The mobile entity of claim 13 wherein the ICE information is sent to the predefined contact.

15. A mobile entity comprising at least one key, a memory and In Case of Emergency (ICE) information stored in said memory; wherein the mobile entity is:
adapted to present a menu for selecting at least one operational mode of said mobile entity as a response to actuating of the key; wherein said menu comprises an option of retrieving the ICE information from the memory of said mobile entity;
adapted to send the ICE information to a contact without rendering the ICE information on the mobile entity as a response to the selection of said option of retrieving the ICE information, the sending of the ICE information being an accessing of the ICE information; and
adapted to inform a user of the mobile entity that the ICE information was accessed by disclosing a message to the user during use of the mobile entity after the accessing of the ICE information.

16. The mobile entity according to claim 15, wherein the key is a power button.

17. The mobile entity according to claim 15, wherein one of said operational modes is a power off mode.

18. The mobile entity according to claim 15, wherein the contact is predefined.

19. The mobile entity according to claim 18, wherein the ICE information is sent to the predefined contact.

* * * * *